(12) United States Patent
Tippery et al.

(10) Patent No.: US 7,552,579 B2
(45) Date of Patent: Jun. 30, 2009

(54) AGRICULTURAL WORKING MACHINE HEADER SUPPORT BETWEEN TRANSPORT AND WORKING POSITIONS

(75) Inventors: Steve Tippery, Omaha, NE (US); Michael Schlueter, Omaha, NE (US)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 9 days.

(21) Appl. No.: 11/859,880

(22) Filed: Sep. 24, 2007

(65) Prior Publication Data

US 2008/0086999 A1 Apr. 17, 2008

(30) Foreign Application Priority Data

Sep. 29, 2006 (EP) .................................. 06121526
May 16, 2007 (EP) .................................. 07108301

(51) Int. Cl.
  *A01B 73/00* (2006.01)
(52) U.S. Cl. ......................................... 56/228; 280/641
(58) Field of Classification Search .................... 56/228, 56/14.5, 14.4, 15.8; 280/641, 789, 124.111; 172/240, 679, 311
See application file for complete search history.

(56) References Cited

U.S. PATENT DOCUMENTS

| | | | | |
|---|---|---|---|---|
| 3,279,158 | A | * | 10/1966 | Kirkpatrick et al. ........... 56/228 |
| 3,457,709 | A | * | 7/1969 | Reimer et al. ................. 56/11.9 |
| 3,517,491 | A | * | 6/1970 | Harer et al. ................... 56/11.9 |
| 3,763,637 | A | | 10/1973 | Schmitt |
| 3,919,831 | A | * | 11/1975 | Halls et al. ..................... 56/228 |
| 4,418,517 | A | * | 12/1983 | Ehrhart et al. ................. 56/228 |
| 4,442,662 | A | * | 4/1984 | Jennings ....................... 56/228 |
| 4,573,309 | A | * | 3/1986 | Patterson ...................... 56/228 |
| 5,243,810 | A | | 9/1993 | Fox et al. |
| 5,970,695 | A | * | 10/1999 | Dunn ............................ 56/228 |
| 6,209,297 | B1 | * | 4/2001 | Yeomans et al. .............. 56/228 |
| 7,197,865 | B1 | * | 4/2007 | Enns et al. .................... 56/228 |
| 7,347,277 | B2 | * | 3/2008 | Enns et al. .................. 172/311 |

FOREIGN PATENT DOCUMENTS

CA  1 188 899  6/1985

* cited by examiner

*Primary Examiner*—Árpád Fábián-Kovács
(74) *Attorney, Agent, or Firm*—Michael J. Striker

(57) ABSTRACT

An agricultural working machine, such as a combine harvester or forage harvester, has a feeding assembly arranged on the front for accommodating a header attachment which is designated to harvest and convey a harvested crop, and at least one gauge wheel attachment comprising at least one support wheel associated with the header attachment on one or both sides of the feeding assembly, wherein the header attachment is arranged pivotally about a rotation axis extending transversely to the longitudinal direction of the agricultural working machine on the feeding assembly in such a manner that the header attachment can be automatically rotated from a working position into a transport position when the feeding assembly is lowered, and at least one support wheel of at least one gauge wheel attachment supports the header attachment on the ground in the transport position. This ensures that the use of a separate header trailer is not necessary. At the same time such a rotating mechanism enables support wheel arrangements to be brought quickly from a working to a non-working position without heavy physical work being required for that alteration.

13 Claims, 4 Drawing Sheets

AGRICULTURAL WORKING MACHINE HEADER SUPPORT BETWEEN TRANSPORT AND WORKING POSITIONS

CROSS-REFERENCE TO A RELATED APPLICATIONS

The invention described and claimed hereinbelow is also described in European Patent Applications EP 06 121 526.5 filed on Sep. 29, 2006 and EP 07 108 301.8 filed on May 16, 2007. This European Patent Applications, whose subject matter is incorporated here by reference, provide the basis for a claim of priority of invention under 35 U.S.C. 119(a)-(d).

BACKGROUND OF THE INVENTION

The invention relates to an agricultural working machine, such as a combine harvester or forage harvester, with a feeding assembly arranged at the front for accommodating a header attachment.

An agricultural working machine of the type mentioned is disclosed in U.S. Pat. No. 5,243,810. The combine harvester disclosed there is provided with an inclined feed duct with which is associated, on the front, a crop cutting unit with a large working width. To ensure that the weight of the crop cutting unit need not be fully supported unilaterally on the ground by the vehicle axles of the combine harvester, and to ensure at the same time that a separate header trailer is not necessary, support wheel arrangements are associated with the header attachment on both sides of the inclined feed duct in its rear region. In the shown embodiment, one of the traveling mechanisms has a supporting wheel while the other traveling mechanism has support wheels arranged in pairs. If the header attachment is in the so-called working position, the axles of the support wheels run substantially parallel with the crop cutting unit so that the support wheels associated with these vehicle axles support the header attachment on the ground during the harvesting operation and consequently a portion of the header attachment weight reaches the ground via the support wheels, which ultimately results in some relief of the load from the vehicle axles.

In the so-called non-working position the gauge wheel attachments of the header can be rotated 90° so that the axles bearing the support wheels are now arranged transversely to the header attachment. This enables the support wheels of the header attachment to be used as a system for transporting the header in the non-working position without the necessity of a separate trailer system. To ensure that the support wheels reach this road transport position, the operator of the agricultural working machine must reposition the relevant gauge wheel attachments when the header attachment is raised and refit them in the new position, offset by 90°, on the locking device provided for the new position. Such a conversion process is time-consuming and also requires major physical effort of the person carrying out the rebuilding work. The weight of the gauge wheel attachments are often high and may require several people for the conversion process.

SUMMARY OF THE INVENTION

The object of the invention is therefore to avoid the disadvantages of the prior art described above and, in particular, to provide a device which eliminates the need for a separate header attachment carriage and which, at the same time, enables support wheel arrangements to be converted from a working to a non-working position without heavy physical work being required for the conversion process, In keeping with these objects and with others which will become apparent hereinafter, one feature of the present invention resides, briefly stated, in an agricultural working machine, comprising a feeding assembly arranged on a front; a header attachment accommodated in said feeding assembly and configured to harvest and convey a harvested crop; at least one gauge wheel attachment including at feast one support wheel and associated with said header attachment on at least one side of said feeding assembly, said header attachment being at least arranged pivotally about a rotation axis extending transversely to a longitudinal direction of the agricultural working machine on said feeding assembly in such a manner that said header attachment is automatically rotatable from a working position into a transport position when said feeding assembly is lowered, and wherein said at least one support wheel of said at least one gauge wheel attachment supports said header attachment on a ground in the transport position.

By designing the agricultural machine with a feeding assembly arranged on the front for accommodating a header attachment, where the adapted header attachment accommodates at least one gauge wheel attachment comprising at least one support wheel on one or both sides of the feeding assembly, and where the header attachment is arranged so that it can be rotated at least about one rotation axis extending transversely to the longitudinal direction of the agricultural working machine on the feeding assembly in such a manner that the header attachment can be simply rotated from a working position into a transport position when the feeding assembly is lowered and at least one of the support wheels of at least one of the gauge wheel attachments supports the header attachment on the ground in the transport position, it is ensured that the use of a separate header attachment carriage is not necessary. At the same time such a rotation mechanism makes it possible to bring support wheel arrangements from a working into a non-working position without heavy physical work being required for the conversion process, In an advantageous embodiment of the invention, the rotation of the header attachment from the working position into the non-working position comprises a rotation range of substantially 90°, so that this small rotation range can be covered quickly and only a small volume is required to perform this rotational movement.

Such a rotation process can be achieved in a simple, compact design when the header attachment has a support frame in its rear region and when the rotation axis extending transversely to the longitudinal direction of the agricultural working machine is associated at the top, and the corresponding support frame structure of the gauge wheel attachment or attachments is associated with this support frame, A rapid adaptation of the header attachment to the feeding assembly, which at the same time takes place almost without any fitting operations to be carried out manually by an operator, is provided in an advantageous alternative of the invention when the rotation axis extending transversely to the longitudinal direction of the agricultural working machine is associated at the top of the header attachment, and the corresponding support frame structure of the gauge wheel attachment or attachments is associated with the support frame of the header attachment, and an intermediate frame is associated with the support frame of the header attachment and can be connected at least fixedly to the feeding assembly, To prevent the header attachment from rotating during the harvesting operation, it is proposed, in an advantageous embodiment of the invention, that the rotation axis extending transversely to the longitudinal direction of the agricultural working machine be locked in the working position of the header attachment.

The weight of the header attachment that can be supported by the gauge wheel attachment or attachments is even greater if, in an advantageous further development of the invention, the support frame structure of at least one of the gauge wheel attachments comprises at least one axle and the axle accommodates at least one support wheel on each side.

So that the gauge wheel attachments associated with the header attachment can be used to support the weight of the header attachment on the ground in the working operation of the agricultural working machine, for example during its use when harvesting in a field, provision is made, in an advantageous embodiment of the invention, for the support frame structure of at least one of the gauge wheel attachments to accommodate a pivot mechanism, where the pivot mechanism is arranged fixedly or pivotally, by means of an intermediate frame structure, on the support frame of the header attachment or the intermediate frame. Since the pivot mechanism enables the axle to rotate at least 90°, the corresponding gauge wheel attachment can be rotated quickly between a working position and a non-working position. A particularly advantageous embodiment of the invention is achieved in this connection if the rotation of the pivot mechanism is able to operate automatically or manually. While automatic rotation relieves the operator of the agricultural working machine of physically heavy rebuilding work to a large extent, manual rotation represents a low cot alternative.

In a further advantageous embodiment of the invention, the feeding assembly can be rotated about a rotation axis extending transversely to the longitudinal direction of the agricultural working machine by means of adjusting cylinders, while at the same time, the rotation of the header attachment is effected about at least one of the swivel axes extending transversely to the longitudinal direction of the agricultural working machine.

By detecting the position of the adjusting cylinders of the feeding assembly and/or the spatial position of the feeding assembly, coding it in the form of position signals and transmitting these position signals to a control and evaluation unit, then generating cylinder adjusting signals for the adjusting cylinders of the header attachment in the control and evaluation unit as a function of the position signals of the feeding assembly, these adjusting signals resulting in automatic rotation of the header attachment about its rotation axis, it can be ensured, during the rotation process, that the support wheels are not overloaded/damaged.

In another embodiment of the invention, provision may be made, during the lowering of the feeding assembly and rotation of the header attachment, for the agricultural working machine to be moved in the rearward direction. The advantage of this is that the horizontal displacement of the support wheel standing on the ground during the rotation process is reduced because at least a portion of this movement is now compensated for by the rearward motion of the agricultural machine. In this connection, a particularly advantageous embodiment of the invention is provided if the distance covered by the agricultural working machine in the rearward direction closely corresponds to the horizontal variation of the length of the header attachment that takes place in the longitudinal direction of the agricultural working machine. This can almost fully compensate for the displacement of the support wheel on the ground during the rotation of the header attachment, so that the supporting wheel and structure are not damaged.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
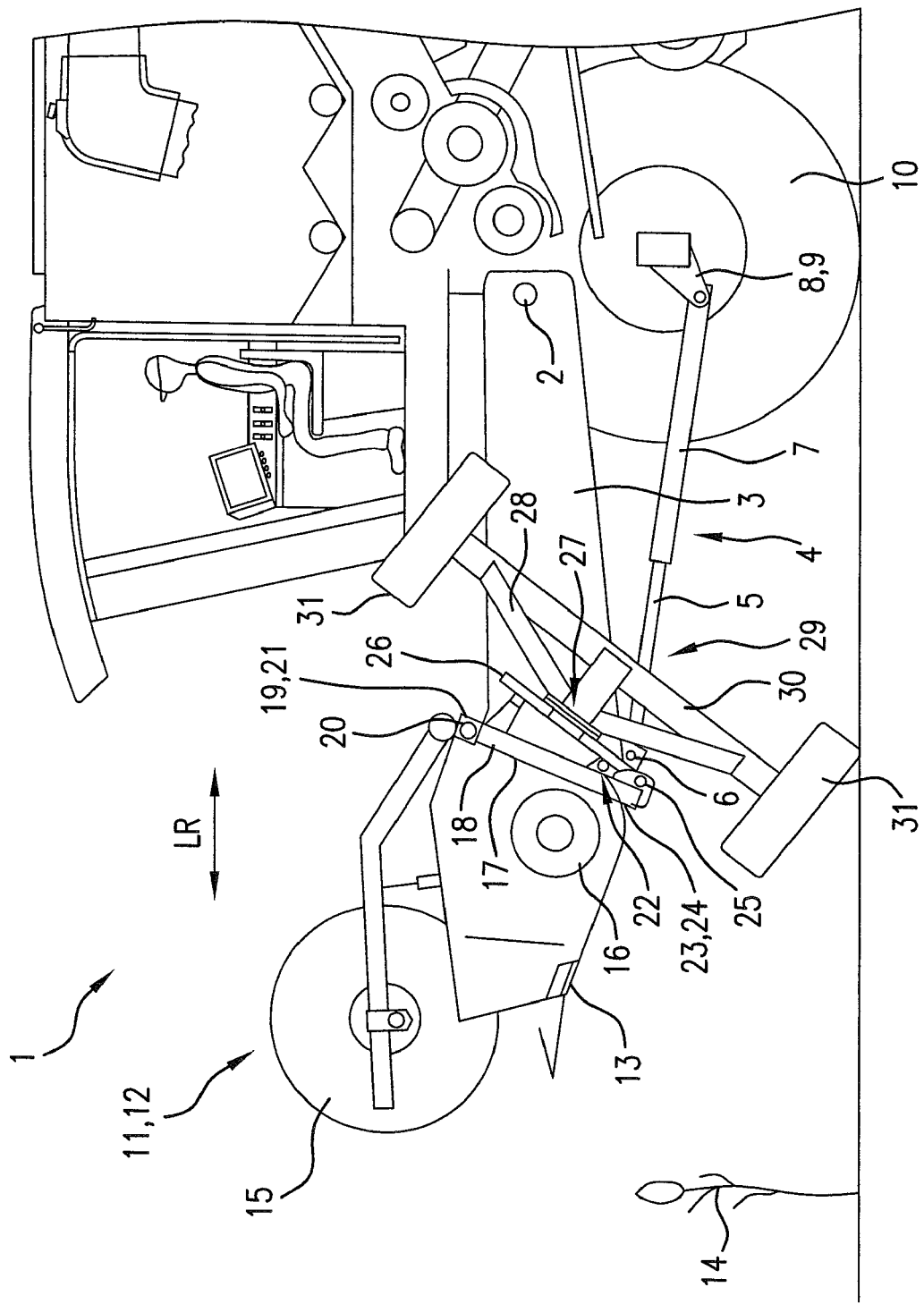
FIG. 1 shows a section of an agricultural working machine with a header attachment adapted on the front, in a side view according to the present invention.

FIG. 1 shows schematically a front section of an agricultural working machine 1, which may be designed, for example, as a combine harvester, forage harvester, or a self-propelled swather. Agricultural working machine 1 accommodates in its front region a rotation axis 2 arranged transversely to its longitudinal direction LR, about which axis a so-called feeding assembly 3 can be rotated from a working position to a non-working and vice versa. According to whether agricultural working machine 1 is designed as a combine harvester or a forage harvester, this feeding assembly 3 would be designed either as a well known inclined conveyor on the combine harvester, or as a drawing-in housing on a forage harvester, also known from prior art.

The rotation of the feeding assembly 3 is generally realized by lifting cylinders 4 arranged on the bottom of the feeding assembly 3, where the piston rods 5 of these cylinders 4 bear upon retaining flanges 6 associated with feeding assembly 3, while the other end of the cylinders 7 are arranged pivotally to the support frame 8 or a front axle 9 of the agricultural working machine 1 accommodating front wheels 10. The feeding assembly 3 is then rotated in the vertically upward or downward direction by pressurizing or depressurizing of the lifting cylinders 4. On its front end the feeding assembly 3 is adapted with the header attachment 12, in the exemplary embodiment designed as crop cutting unit 11, details of the adaptation will be described below. In a manner known from prior art, the header attachment 12 is provided with a cutter bar unit 13 for harvesting a grown crop 14, which is positioned during the harvesting process by a reel 15 associated with the header attachment 12, and is finally collected by a transverse conveying mechanism 16 and transferred to the feeding assembly 3 arranged rearward of the header attachment 12.

The rear wall 17 of the header attachment 12 is reinforced by a support frame 18, which in its top region accommodates a rotation axis 19 extending transversely to the longitudinal direction LR of the agricultural working machine 1. In the simplest case this rotation axis 19 is formed by retaining flanges 20 with through holes mounted on feeding assembly 12 in its front and top regions, to which flanges are fastened by a locking mechanism 21, e.g. fastening bolts 21. To ensure that the header attachment 12 bears precisely upon feeding assembly 3, it is at the same time fixed to feeding assembly 3 by means of known locking devices 22 in its bottom region. These locking devices 22 may also be formed on one side by fastening bolts 23 interacting with flanges. However, it is also conceivable for fastening bolts 23 themselves to be designed as hydraulic or electrical adjusting elements 24, so that these locking devices 22 could also be remotely activated and the fastening bolts 23 would not have to be inserted or pulled out directly by hand.

Furthermore, retaining flanges 25, which are fixedly connected to an intermediate frame structure 26, are formed on support frame 18 of the header attachment 3 in its bottom region. Arranged almost centrally and on the side facing away from the header attachment 3, the intermediate frame structure 26 accommodates a pivot mechanism 27, which is connected fixedly or pivotally at the other end to the support frame structure 28 of a gauge wheel attachment 29. The gauge wheel attachment 29 comprises, at the bottom, an axle 30, which accommodates freely rotating support wheels 31 on both sides. It lies within the scope of the invention for the gauge wheel mechanism 29 described to be arranged on header attachment 12, on both sides of the feeding assembly 3, and to comprise only one support wheel 31 or a plurality of support wheels 31 which are carried by a frame structure for shaping a so-called under carriage structure.

Figure 2:
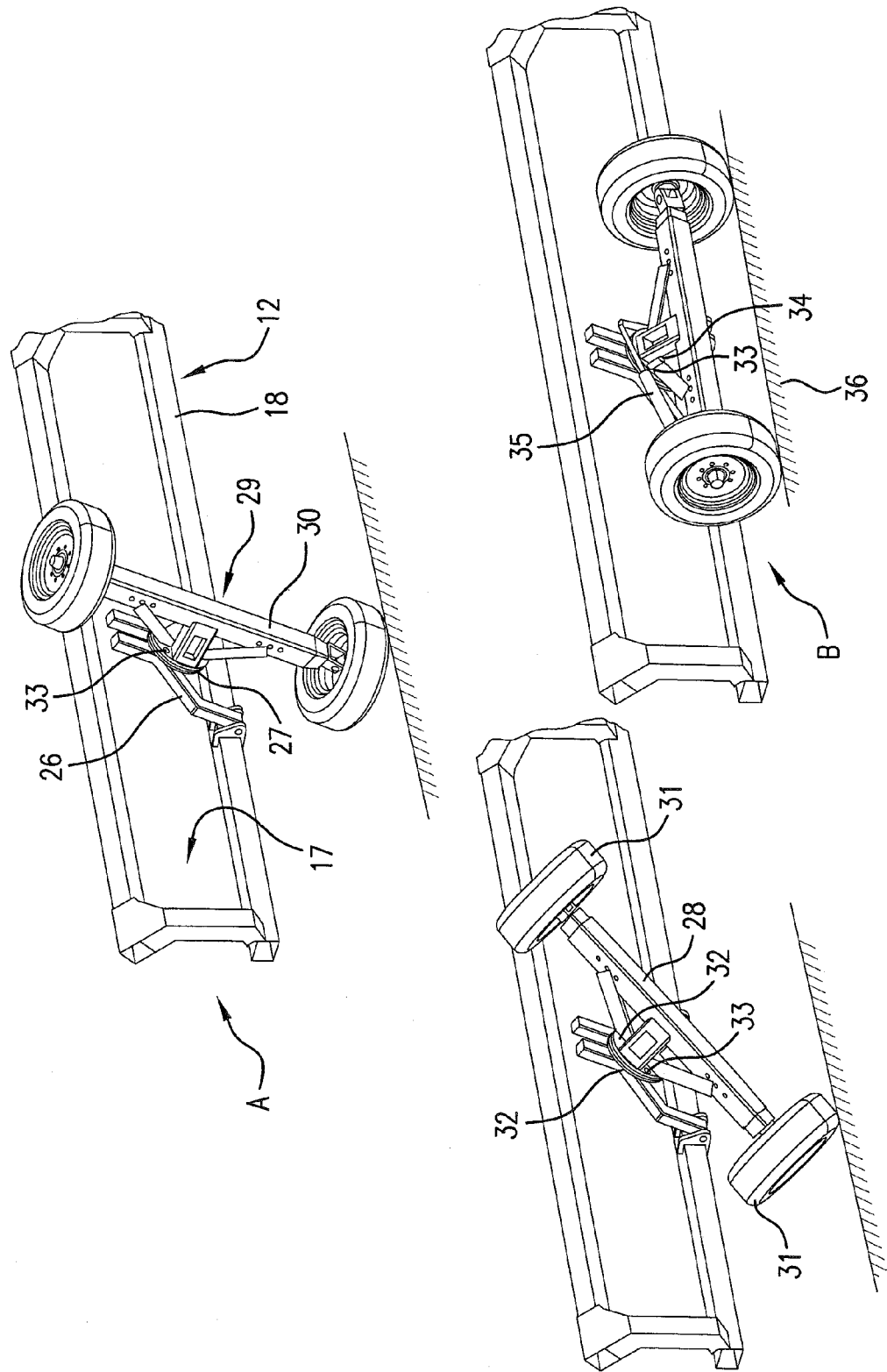
FIG. 2 shows a detailed view of the gauge wheel attachment, with support wheels in non-working position A and working position B according to the present invention.

According to FIG. 2 the support frame structure 28 of the gauge wheel attachment 29 accommodating support wheels 31 can be rotated from a so-called non-working position A, in which axle 30 is located in a vertical position extending almost transverse to rear wall 17 of the header attachment 12 to a working position B, in which the axle of the gauge wheel attachment 30 then extends approximately parallel to the rear wall 17 of the header attachment 12. In a very simple embodiment, this rotation may be carried out by hand. To accommodate this movement, the flanges 32 of the pivot mechanism 27, lying one on top of the other, must contain holes 33 and a removable bolt 34 that are used to determine the position of the flanges 32 relative to each other in both the working position B and the non-working position A, In a user friendly embodiment, a remotely controllable adjusting element 35, for example a lifting cylinder may also be provided, which cylinder can be electrically, hydraulically, or pneumatically actuated, which rotates the flanges 32 of the pivot mechanism 27 one against the other so that the gauge wheel attachment 29 can be automatically rotated between the working position B and the non-working position A.

Because said gauge wheel attachment 29 can be rotated in the described manner, a position of the gauge wheel attachment 29 can be reached, in working position B, where the support wheels 31 support a considerable portion of the weight of the header attachment 12 directly on the ground 36 during harvesting, so that there is no overloading of the vehicle axles 9 of the agricultural working machine 1. So that the gauge wheel attachment 29 always adopts an optimum position relative to the ground 36 due to the geometric conditions of the header attachment 12 and its association with feeding assembly 3 in the working position B, the intermediate frame structure 26 fastened to support frame 18 and accommodating gauge wheel attachment 29 has an inclined arrangement relative to the rear wall 17 of the header attachment 12.

Figure 3:
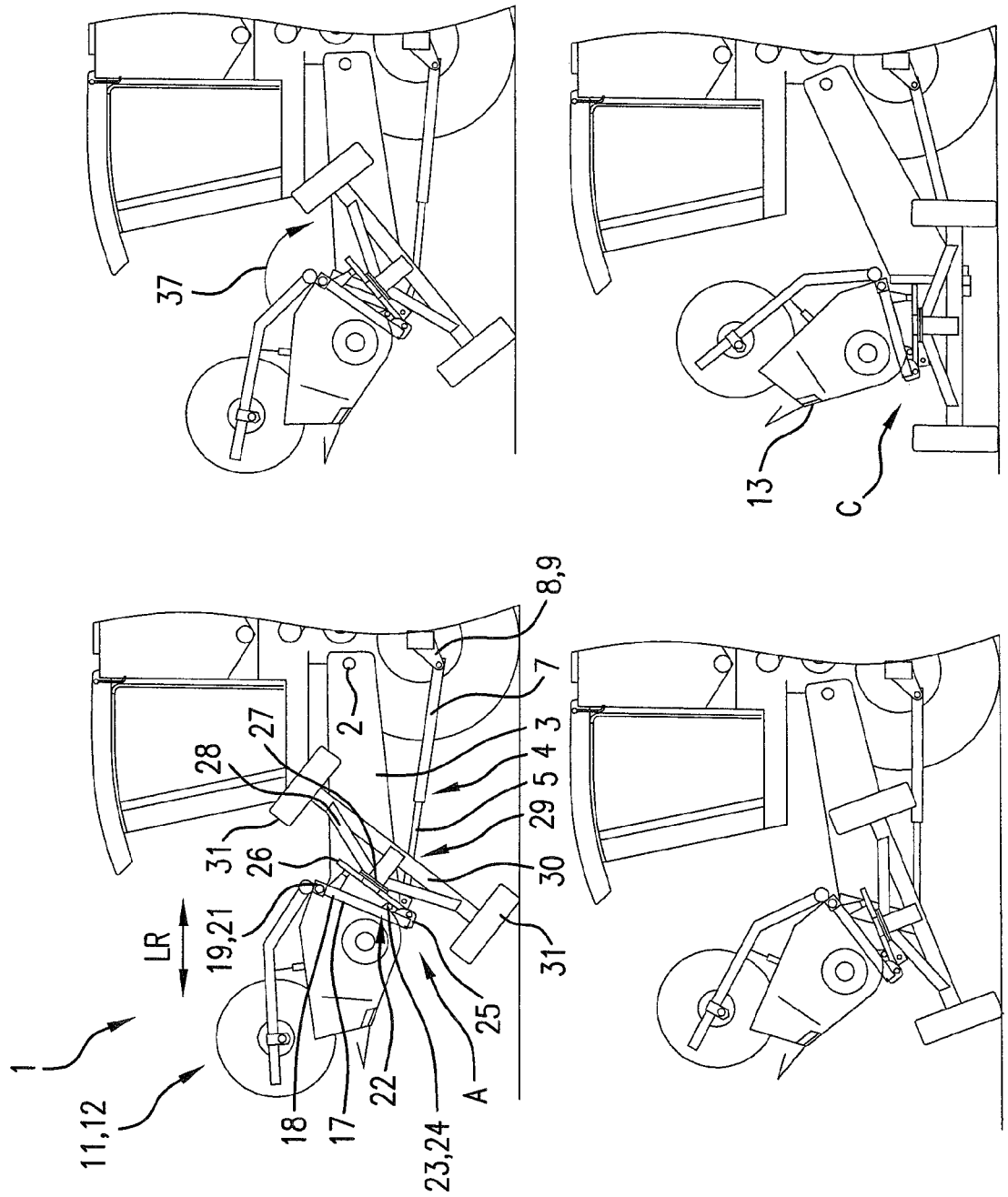
FIG. 3 shows a detailed view of the rotation of the header attachment from the non-working position A into the transport position C according to the present invention.

FIG. 3 now describes the process according to the invention in which the header attachment 12 rotates into transport position C. At first the header attachment 12 is lifted into a raised position, shown in the first picture of FIG. 3 by pressurizing of the lifting cylinders 4 associated with feeding assembly 3. The gauge wheel attachment 29 is then positioned in its non-working position A by actuating the pivot mechanism 27, as already described. The locking devices 22, described in more detail below, which fixedly connect the header attachment 12 to the feeding assembly 3 in a region close to the ground, are then detached. While the pressurizing of the lifting cylinders 4 retracts the piston rods 5, the feeding assembly 3 is lowered toward the ground 36. Since the header attachment 12, after locking devices 22 are detached, can now be freely rotated about its rotation axis 19 arranged transversely to the longitudinal direction LR of the agricultural working machine 1, the header attachment 12 begins to rotate at that moment about this rotation axis according to arrow direction 37 as soon as one of wheels 31 is supported on the ground 36.

As the feeding assembly 3 is lowered, the header attachment 12 will reach the so-called transport position C, where the support wheels 31 associated with the gauge wheel attachment 29 have reached a position in which they are able to support the weight of the header attachment 12 on the ground 36, The header attachment 12 then being arranged so that its cutter bar unit 13 points substantially in a vertical and upwards direction. The particular advantage of this is also that there is reduced risk of injury from the knives of the cutter bar unit 13 during road transport since they point upwards and are therefore difficult to access. Another aspect of such an arrangement concerns the realizing of reduced transport widths to meet legal transport width requirements.

Figure 4:
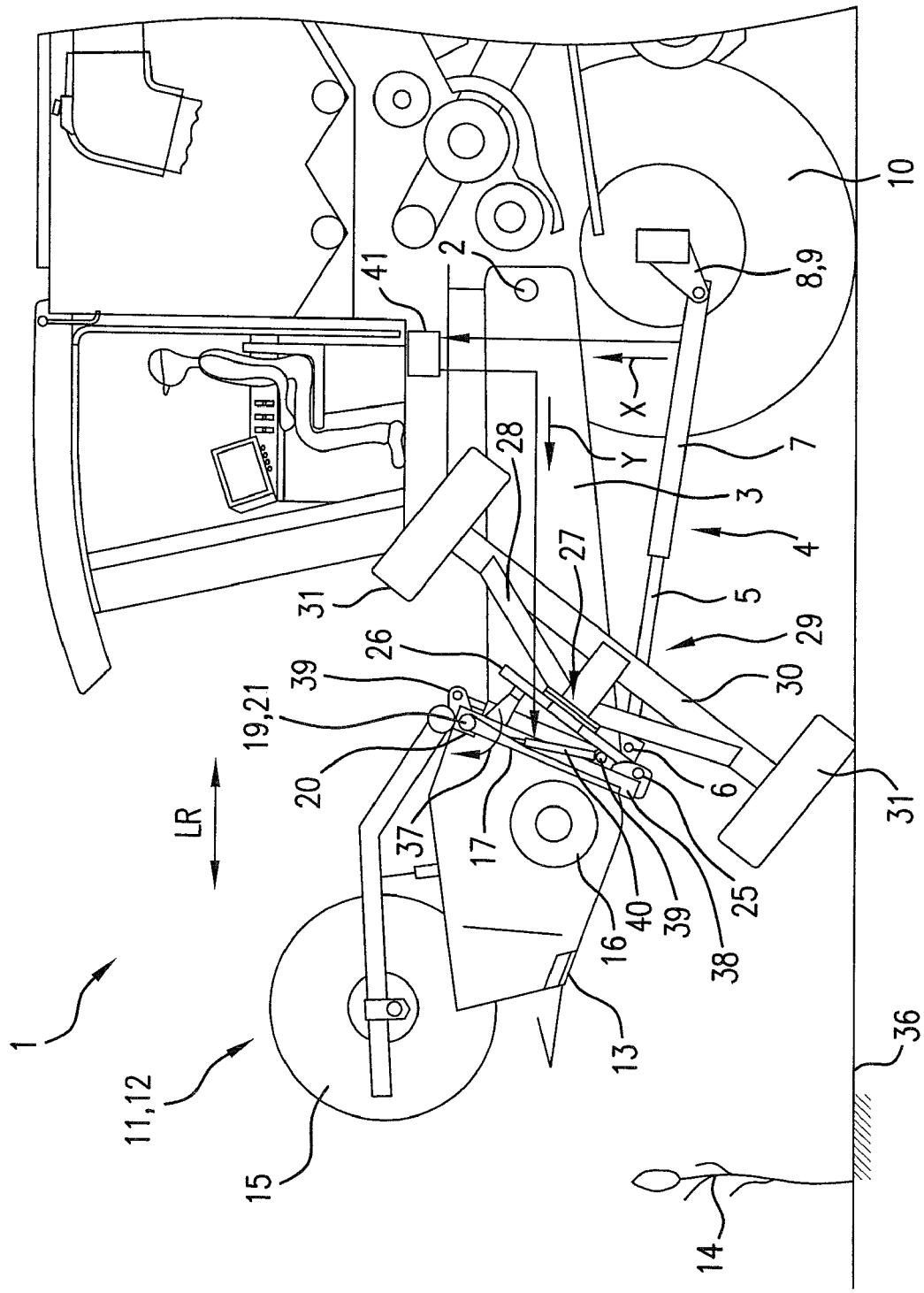
FIG. 4 shows a detailed embodiment of the header attachment in a side view according to the present invention.

In an embodiment of the invention provision may be made, according to FIG. 4, for the rotation axis 19 of the header attachment 12 to be integrated in an intermediate frame 38, and for the intermediate frame 38 to be fixedly connected, by suitable locking means 39 of prior art, such as quick-release fasteners, to the front region of the feeding assembly 3. The advantage of such an arrangement is that the header attachment 12 can be adapted quickly to the agricultural working machine 1. This effect is particularly advantageous, for example, when the rotation 37 of the header attachment 12 about its rotation axis 19 is caused by pressure-loadable lifting cylinders 40. These could be integrated directly in the intermediate frame 38, and, if necessary, also in the hydraulic supply systems required for their operation.

As shown in FIG. 4 the cylinder end of at least one lifting cylinder 40 is pivotally coupled with the front and lower end of the feeder house 3. The piston rod end of at least one lifting cylinder 40 is pivotally connected with the rear wall 17 of the header attachment 12.

A particularly efficient support of the rotation of the header attachment 12 is provided when the pressurizing of these lifting cylinders 40 is coupled, described in greater detail later, to the pressurizing of the lifting cylinders 4 of the feeding assembly 3. This would then also have the advantage that the header attachment 12 would not have to be supported almost completely by a support wheel 31 on the ground 36 during the rotation process, so potential damage resulting from the displacement of the wheel on the ground 36 and transverse to its axis of rotation would be reduced. In a preferred embodiment a control and evaluation unit 41 is associated either with the agricultural working machine 1 or the header attachment 12, which unit determines the spatial position of the feeding assembly 3. and particularly its position relative to the ground 36, on the basis of the known geometric relationships from pressure signals X determined on the lifting cylinders 4 of the feeding assembly 3 in a manner known from prior art and therefore not described in further detail.

Because the geometry of the relevant header attachment 12 and its position relative to the feeding assembly 3 are known, the control and evaluation unit 41 can now generate cylinder adjusting signals Y derived from the pressure signals X, which define according to the described invention the position signals Z, for pressurizing or depressurizing the lifting cylinders 40 associated with the header attachment 12, whereas the cylinder adjusting signals Y control the rotation 37 of the header attachment 12 in such a manner that the loads acting on support wheels 31 are reduced. On the other side the sliding of the support wheels 31 on the ground may also be reduced or fully prevented thereby if the agricultural working machine 1 travels backwards as long as the header attachment 12 accomplishes a pivotal movement 37 on its rotation axis 19, so that not the support wheels 31, but the agricultural working machine 1, compensates the length variations that occur and whereas the support wheels 31 remain substantially in one position.

It will be understood that each of the elements described above, or two or more together, may also find a useful application in other types of constructions differing from the type described above.

While the invention has been illustrated and described as embodied in an agricultural working machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as a new and desired to be protected by Letters Patent is set forth in the appended claims.

1. An agricultural working machine, comprising a feeding assembly arranged on a front; a header attachment accommodated in said feeding assembly and configured to harvest and convey a harvested crop; at least one gauge wheel attachment including at least one support wheel associated with said header attachment on at least one side of said feeding assembly, said header attachment being at least arranged pivotally about a rotation axis extending transversely to a longitudinal direction of the agricultural working machine on said feeding assembly in such a manner that said header attachment is automatically rotatable from a working position into a transport position when said feeding assembly is lowered, and wherein said at least one support wheel of said at least one gauge wheel attachment supports said header attachment on a ground in the transport position.

2. An agricultural working machine as defined in claim 1, wherein said header attachment is configured such that a rotation of said header attachment from said working position into said non-working position has a rotation angle of substantially 90°.

3. An agricultural working machine as defined in claim 1, wherein said header attachment has a rear region provided with a support frame, so that a rotation axis extending transversely to the longitudinal direction of the agricultural working machine is associated with said support frame at a top, wherein said gauge wheel attachment has a support frame structure associated with said support frame.

4. An agricultural working machine as defined in claim 3, further comprising an intermediate frame, wherein said rotation axis extending transversely to said longitudinal direction of the agricultural working machine is associated with said intermediate frame at the top and is fixedly connectable to said feeding assembly, while said gauge wheel attachment is associated with said support frame of said header attachment.

5. An agricultural working machine as defined in claim 3, wherein said rotation axis extending transversely to said longitudinal direction of the agricultural working machine is locked in the working position of said header attachment.

6. An agricultural working machine as defined in claim 3, wherein said support frame structure of said gauge wheel attachment includes at least one axle which has at least one support wheel on both sides.

7. An agricultural working machine as defined in claim 4, wherein said support structure of said gauge wheel attachment includes a pivot mechanism arranged in a manner selected from the group consisting of fixedly and pivotally on a frame of said header attachment selected from the group consisting of said support frame and said intermediate frame, by an intermediate frame structure.

8. An agricultural working machine as defined in claim 6, further comprising a pivot mechanism allowing rotation of said axle of said gauge wheel attachment over at least 90°.

9. An agricultural working machine as defined in claim 8, wherein said pivot mechanism is configured so that a rotation of said pivot mechanism operates in a manner selected from the group consisting automatically or by hand.

10. An agricultural working machine as defined in claim 6, wherein said axle of said gauge wheel attachment of the working position of said header attachment is rotatable into at least one position in which at least one of said support wheels of said gauge wheel attachment supports said header attachment on the ground.

11. An agricultural working machine as defined in claim 6, wherein said gauge wheel attachment is configured so that during a movement of said header attachment between said working position and a non-working position, and vice versa said wheel of said gauge wheel attachment is locked.

12. An agricultural working machine as defined in claim 1, further comprising first adjusting cylinders for rotating said feeding assembly about a rotation axis extending transversely to the longitudinal direction of the agricultural working machine, and second adjusting cylinder for rotating said header attachment about at least one of rotation axes extending transversely to said longitudinal direction of the agricultural working machine, and a control and evaluation unit for receiving position signals of said feeding assembly and generating cylinder adjusting signals for said second adjusting cylinders of said header attachment as a function of the position signals of said feeding assembly, such that the cylinder adjusting signals result in automatic rotation of said header attachment about said rotation axis.

13. An agricultural machine as defined in claim 1, wherein the agricultural machine is the agricultural machine selected from the group consisting of a combine harvester and a forage harvester.

* * * * *